(12) United States Patent
Kho et al.

(10) Patent No.: US 10,379,617 B2
(45) Date of Patent: Aug. 13, 2019

(54) TOUCH SENSITIVE ELEMENT AND DISPLAY DEVICE COMPRISING THE SAME

(71) Applicant: LG Display Co., Ltd., Seoul (KR)

(72) Inventors: YuSeon Kho, Seoul (KR); YongSu Ham, Seoul (KR); TaeHeon Kim, Seoul (KR); YongWoo Lee, Goyang-si (KR); KyungYeol Ryu, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/820,215

(22) Filed: Nov. 21, 2017

(65) Prior Publication Data

US 2018/0157325 A1 Jun. 7, 2018

(30) Foreign Application Priority Data

Dec. 7, 2016 (KR) .................. 10-2016-0166237

(51) Int. Cl.
| | |
|---|---|
| G06F 3/01 | (2006.01) |
| G06F 3/041 | (2006.01) |
| G06F 3/044 | (2006.01) |
| G02F 1/1333 | (2006.01) |

(52) U.S. Cl.
CPC .............. G06F 3/016 (2013.01); G06F 3/041 (2013.01); G06F 3/044 (2013.01); G06F 3/0412 (2013.01); *G02F 1/13338* (2013.01); *G06F 2203/04112* (2013.01)

(58) Field of Classification Search
CPC ..................................................... G06F 3/016
See application file for complete search history.

(56) References Cited

U.S. PATENT DOCUMENTS

| | | | | |
|---|---|---|---|---|
| 9,972,768 | B2* | 5/2018 | Levatich | ............... H01L 41/083 |
| 2008/0084384 | A1* | 4/2008 | Gregorio | ................. G06F 3/016 |
| | | | | 345/156 |
| 2009/0115734 | A1* | 5/2009 | Fredriksson | ............ G06F 3/016 |
| | | | | 345/173 |

(Continued)

FOREIGN PATENT DOCUMENTS

| | | |
|---|---|---|
| KR | 20120099036 | 9/2012 |
| KR | 20130089211 | 8/2013 |

(Continued)

*Primary Examiner* — Xuemei Zheng
(74) *Attorney, Agent, or Firm* — Fenwick & West LLP

(57) ABSTRACT

Provided are a touch sensitive element and a display device. A touch sensitive element according to an exemplary embodiment includes an electroactive layer including a plurality of electroactive films formed of an electroactive polymer; and a plurality of electrodes disposed on at least one surface of the electroactive layer. In this case, the plurality of electroactive films is configured by a first electroactive film, a second electroactive film, and one or more electroactive films between the first electroactive film and the second electroactive film. A modulus of one or more electroactive films is higher or lower than both a modulus of an electroactive film which is in contact with an upper surface and a modulus of an electroactive film which is in contact with a lower surface. The touch sensitive element according to the exemplary embodiment of the present disclosure may implement a sufficient vibration strength in all frequency domains.

21 Claims, 11 Drawing Sheets

(56) References Cited

U.S. PATENT DOCUMENTS

| | | |
|---|---|---|
| 2011/0090070 A1 | 4/2011 | Modarres et al. |
| 2013/0194084 A1 | 8/2013 | Lacroix et al. |
| 2015/0084483 A1 | 3/2015 | Yoo et al. |
| 2015/0155474 A1* | 6/2015 | Tanimoto ............... H01L 41/083 310/332 |

FOREIGN PATENT DOCUMENTS

| | | |
|---|---|---|
| KR | 20150002811 | 1/2015 |
| KR | 20150068770 | 6/2015 |

* cited by examiner

TOUCH SENSITIVE ELEMENT AND DISPLAY DEVICE COMPRISING THE SAME

CROSS-REFERENCE TO RELATED APPLICATIONS

This application claims the priority of Republic of Korea Patent Application No. 10-2016-0166237 filed on Dec. 7, 2016, in the Korean Intellectual Property Office, the disclosure of which is incorporated herein by reference in its entirety.

BACKGROUND

Field

The present disclosure relates to a touch sensitive element and a display device including the same, and more particularly, to a touch sensitive element which provides a tactile feedback of various textures and a display device including the same.

Description of the Related Art

Recently, in response to a demand of users who want to use various display devices including a liquid crystal display device and an organic light emitting display device, a touch type display device which touches a display device to input information is broadly used. Therefore, research for utilizing a haptic device to provide direct and various touch feedback to the users is continued. Specifically, a haptic device of the related art is attached on a rear surface of a display panel, so that it is difficult to provide immediate and delicate feedback for the user's touch. Therefore, research is actively performed to provide various and direct feedback which is sensitive to the user's touch by positioning the haptic device above the display panel.

According to the related art, a vibration motor such as an eccentric rotating mass (ERM) or a linear resonant actuator (LRA) is used for the display device as a haptic device. The vibration motor is configured to vibrate the entire display device. Therefore, there are problems in that a size of a mass needs to be increased in order to increase a vibration strength, it is difficult to modulate a frequency to adjust the vibration level, and a response speed is very slow. Further, the eccentric rotating mass and the linear resonant actuator are formed of an opaque material so that it is difficult to dispose eccentric rotating mass and the linear resonant actuator above the display panel.

In order to solve the above-described problems, a shape memory alloy (SMA) and electroactive ceramics (EAC) have been developed as a material for the haptic device. However, the shape memory alloy (SMA) has a slow response speed and a short life-span and is formed of an opaque material. Further, the electroactive ceramics has a low durability against the external impact so that the electroactive ceramics are easily broken due to an external impact and are opaque. Further, it is difficult to make the electroactive ceramics thinner.

Further, the haptic device of the related art has unique resonance frequency according to a material so that necessary vibration strength is transmitted only in a specific frequency domain. Specifically, since a tactile feedback sensed by the user may vary according to each frequency domain, there is a limit of transmitting various textures and tactile feelings to the user using the haptic device of the related art.

SUMMARY

Therefore, an object to be achieved by the present disclosure is to provide a touch sensitive element which is transparent and provides a tactile feedback of various textures to a user and a display device including the same.

Further, another object to be achieved by the present disclosure is to provide a touch sensitive element which has excellent response characteristics according to a frequency in all frequency domains including a low frequency domain and a display device including the same.

Objects of the present disclosure are not limited to the above-mentioned objects, and other objects, which are not mentioned above, can be clearly understood by those skilled in the art from the following descriptions.

According to an aspect of the present disclosure, there is provided a touch sensitive element. a touch sensitive element, includes: an electroactive layer including a plurality of electroactive films and a plurality of electrodes which is disposed on at least one surface of the electroactive layer. In this case, a modulus of each of the plurality of electroactive films is larger or smaller than moduli of two electroactive films adjacent to an upper surface and a lower surface. The touch sensitive element according to an aspect of the present disclosure may implement a sufficient vibration strength in all frequency domains.

According to another aspect of the present disclosure, there is provided a touch sensitive element. The touch sensitive element includes an electroactive layer which is formed of a first electroactive film having a first modulus, a second electroactive film having a second modulus, and a third electroactive film having a third modulus disposed between the first electroactive film and the second electroactive film and a plurality of electrodes which is disposed on at least one surface of the electroactive layer. In this case, the third modulus is larger or smaller than the first modulus and the second modulus.

According to still another aspect of the present disclosure, there is provided a touch sensitive element. The touch sensitive element includes an electroactive layer which is formed of a first electroactive film, a second electroactive film, and a third electroactive film disposed between the first electroactive film and the second electroactive film; and a plurality of electrodes which is disposed on at least one surface of the electroactive layer. In this case, a resonance frequency of the third electroactive film is different from resonance frequencies of the first electroactive film and the second electroactive film.

According to still another aspect of the present disclosure, there is provided a display device. The display device includes a display panel, a cover disposed above the display panel; and a touch sensitive element disposed below the cover. in this case, the touch sensitive element includes an electroactive layer including a plurality of electroactive films and a plurality of electrodes disposed on at least one surface of the electroactive layer and a modulus of each of the plurality of electroactive films is larger or smaller than moduli of two electroactive films adjacent to an upper surface and a lower surface.

Other detailed matters of the exemplary embodiments are included in the detailed description and the drawings.

According to the present disclosure, a plurality of electroactive films having different moduli is non-sequentially laminated so that sufficient vibration strength in all frequency domains may be implemented.

According to the present disclosure, the response characteristic according to a frequency is excellent in all frequency domains so that a tactile feedback of various textures may be provided to the user.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
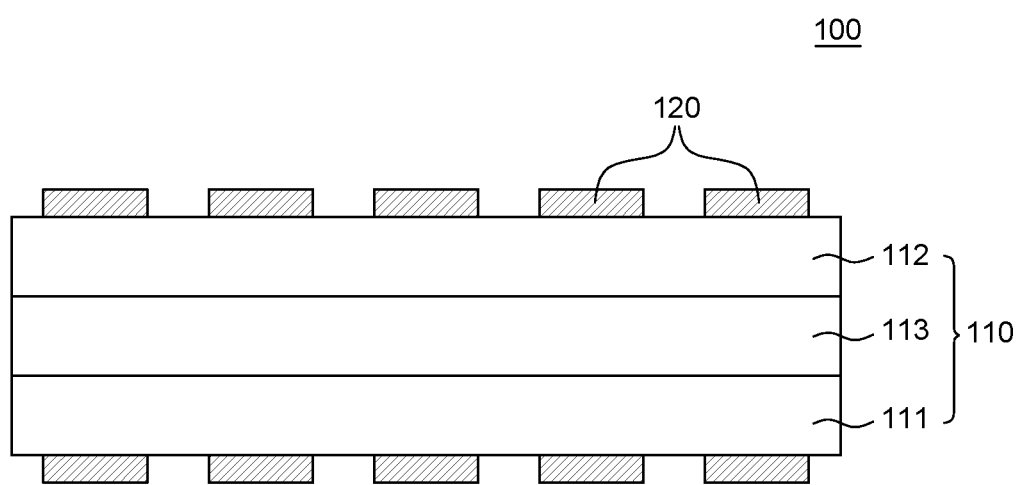
FIG. 1 is a schematic cross-sectional view for explaining a touch sensitive element according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed "on" other element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely coupled to or combined with each other and can be interlocked and operated in technically various ways, and the embodiments can be carried out independently of or in association with each other.

Hereinafter, various exemplary embodiments of the present disclosure will be described in detail with reference to accompanying drawings.

FIG. 1 is a schematic cross-sectional view for explaining a touch sensitive element according to an exemplary embodiment of the present disclosure. Referring to FIG. 1, a touch sensitive element 100 according to an exemplary embodiment of the present disclosure includes an electroactive layer 110 and a plurality of electrodes 120.

The plurality of electrodes 120 apply an electric field to the electroactive layer 110 to induce vibration or bending by an electrical stimulation. The electrodes 120 may be disposed to have various shapes and various numbers of electrodes may be disposed as needed. For example, as illustrated in FIG. 1, a plurality of electrodes 120 may be disposed on an upper surface and a lower surface of the electroactive layer 110 or a plurality of electrodes may be disposed on any one of the upper surface and the lower surface of the electroactive layer 110.

Specifically, electrodes 120 may be disposed on both the upper surface and the lower surface of the electroactive layer 110. In this case, the electrode 120 disposed on the upper surface of the electroactive layer 110 extends in an X-axis direction and the electrode 120 disposed on the lower layer of the electroactive layer 110 extends in a Y axis direction to form a vertical arrangement structure in which the electrodes intersect each other to be disposed in a matrix. Further, a horizontal arrangement structure in which the electrodes 120 are disposed on only one surface of the electroactive layer 110 may be formed. Further, the plurality of electrodes 120 are disposed to be opposite to each other on the upper surface and the lower surface of the electroactive layer 110 in one cell so that a multilayer structure in which both the vertical arrangement structure and the horizontal arrangement structure of the electrode 120 are implemented may be formed.

The electrode 120 is formed of a conductive material. Further, in order to secure light transmittance of the touch sensitive element 100, the electrode 120 may be formed of a transparent conductive material. For example, the electrode 120 may be formed of a transparent conductive material such as indium tin oxide (ITO), indium zinc oxide (IZO), graphene, metal nano wire, and transparent conductive oxide (TCO). Further, the electrode 120 may be formed of a metal mesh. That is, the electrode 120 is formed of a metal mesh in which a metal material is disposed to have a mesh type so that the electrode 120 may be configured to be substantially transparently visible. However, a constituent material of the electrode 120 is not limited to the above-described example, but various transparent conductive materials may be used for the constituent material of the electrode 120. When a plurality of electrodes 120 are configured, each of the electrodes may be formed of the same material or different materials.

The electrode 120 may be formed by various methods. For example, the electrode 120 may be formed on the electroactive layer 110 by a method such as sputtering, printing, and slit coating.

The electroactive layer 110 may refer to a layer which is deformed to generate vibration as a voltage is applied. The electroactive layer 110 has a laminated structure. Specifically, the electroactive layer 110 includes a plurality of electroactive films 111, 112, and 113. The electroactive layer 110 of the touch sensitive element 100 illustrated in FIG. 1 includes a first electroactive film 111, a second electroactive film 112, and a third electroactive film 113 between the first electroactive film 111 and the second electroactive film 112. Even though in FIG. 1, it is illustrated that the electroactive layer 110 includes three electroactive films, the electroactive layer 110 may include four or more electroactive films. That is, the electroactive layer 110 may include one or more electroactive films between the first electroactive film 111 and the second electroactive film 112.

The electroactive film may be formed by an extrusion process or formed by a solution casting process in which a solution is applied and then baked. Further, in the present disclosure, even though the plurality of layers which configures the electroactive layer is described as films, the plurality of layers which configures the electroactive layer may include a coating layer rather than a film type.

The touch sensitive element 100 according to the exemplary embodiment of the present disclosure includes a plurality of electroactive films having at least two different moduli. The modulus of each of the plurality of electroactive films may be larger or smaller than the moduli of two electroactive films which are adjacent to the upper surface and the lower surface.

More specifically, in the touch sensitive element 100 according to the exemplary embodiment of the present disclosure, electroactive films having at least two different moduli are non-sequentially laminated according to a magnitude of the modulus. Here, when the plurality of electroactive films are sequentially laminated according to the magnitude of the modulus, the plurality of electroactive films is disposed in an order in which the magnitudes of the moduli are continuously increased or in an order in which the magnitudes of the moduli are continuously decreased. When the plurality of electroactive films is non-sequentially laminated according the magnitudes of the moduli, it means a structure other than the above-described structure in which the electroactive films are sequentially laminated. For example, in a structure in which three electroactive films are disposed, when a modulus of an electroactive film disposed in the middle is larger or smaller than both the electroactive films adjacent to both surfaces, it is a structure in which three electroactive films are non-sequentially laminated according to the magnitudes of the moduli. Further, a structure in which four electroactive films are non-sequentially laminated according to magnitudes of moduli may refer to a structure in which a modulus of an electroactive film on a second layer is larger than that of the lowermost electroactive layer, a modulus of an electroactive film on a third layer is smaller than that of the electroactive film on the second layer, and the modulus of the uppermost electroactive film is larger than that of the electroactive layer on the third layer. Further, the structure may refer to a structure in which the modulus of the electroactive film on the second layer is smaller than that of the lowermost electroactive layer, the modulus of the electroactive film on the third layer is larger than that of the electroactive film on the second layer, and the modulus of the uppermost electroactive film is smaller than that of the electroactive layer on the third layer.

In the touch sensitive element 100 illustrated in FIG. 1, the first electroactive film 111 has the same modulus as the second electroactive film 112 and the third electroactive film 113 has a modulus different from that of the first electroactive film 111 and the second electroactive film 112. That is, a first modulus of the first electroactive film 111 is equal to a second modulus of the second electroactive film 112 and a third modulus of the third electroactive film 113 is different from the first modulus and the second modulus. Therefore, in the touch sensitive element 100 illustrated in FIG. 1, the third electroactive film 113 having different modulus from the first modulus of the first electroactive film 111 and the second modulus of the second electroactive film 112 is disposed between the first electroactive film 111 and the second electroactive film 112. Therefore, the electroactive layer 110 has a structure in which the electroactive films are non-sequentially laminated according to the magnitudes of the moduli.

Here, the modulus refers to a ratio of a strain with respect to a stress. A large modulus means that a strain of a material for the same stress is small. The material having a large modulus is hardly deformed even under a strong stress, so that a rigidity is excellent and an impact applied to a part of the material is satisfactorily transmitted to other part of the material.

A different moduli between the plurality of electroactive films 111, 112, and 113 may be determined by a material which configures the electroactive film. That is, the modulus of the electroactive film may be determined by changing the material which configures the electroactive film.

The plurality of electroactive layers 111, 112, and 113 is formed of an electroactive polymer (EAP) which is deformed by an electrical stimulation. For example, the electroactive polymer may be dielectric elastomer or ferroelectric polymer. Specifically, the dielectric elastomer may be one or more kinds selected from the group consisting of acrylic-based polymer, urethane-based polymer, and silicon-based polymer, but is not limited thereto. Further, the ferroelectric polymer may be polyvinylidene fluoride (hereinafter, PVDF)-based polymer. The PVDF-based polymer refers to a polymer including a PVDF repeating unit in a main chain of the polymer, and for example, may be PVDF homopolymer, PVDF copolymer, or PVDF terpolymer. When it is considered that the ferroelectric polymer has permittivity superior to the dielectric elastomer, the electroactive films may be desirably configured by the ferroelectric polymer, but is not limited thereto.

In order to implement the electroactive films having different moduli, the plurality of electroactive films 111, 112, and 113 may be configured by different materials selected from the above-described electroactive polymers. For example, some electroactive films may be configured by a PVDF homopolymer and other electroactive films may be configured by a PVDF copolymer.

Further, the electroactive films having different PVDF moduli may be configured by differently adjusting a fraction of a repeating unit of configuring the PVDF copolymer or the PVDF terpolymer. The PVDF copolymer is a binary copolymer of a VDF monomer and one monomer selected from the group consisting of trifluoroethylene (TrFE), chlorotrifluoroethylene (CTFE), tetrafluoroethylene (TFE), chlorofluoroethylene (CFE), hexafluoropropene (HFP), and perfluoromethylvinylether (PMVE). The PVDF terpolymer is a ternary copolymer of the VDF monomer and two kinds of monomers selected from the group consisting of TrFE, TFE, CFE, CTFE, HFP, and PMVE. In this case, the PVDF copolymer or the PVDF terpolymer included in the electroactive film may implement the difference of moduli between the plurality of electroactive films by adjusting a fraction of the configured monomers. More specifically, the electroactive films may be configured by P(VDF-TrFE-CFE) having different fractions of repeating units.

Further, the modulus may vary by a density or hardness of the electroactive film. Therefore, when the electroactive films are laminated using the same or similar materials, the density or the hardness of the electroactive film is significantly changed to implement the modulus difference between the plurality of electroactive films.

For example, the plurality of electroactive films 111, 112, and 113 may have different thicknesses. For example, more specifically, in the touch sensitive element 100 illustrated in FIG. 1, a thickness of the third electroactive film 113 may be different from the thicknesses of the first electroactive film 111 and the second electroactive film 113 having a modulus different from that of the third electroactive film 113.

When the thickness of the third electroactive film 113 is larger than the thicknesses of the first electroactive film 111 and the second electroactive film 112, an overall frequency response characteristic may be broadened as compared with the case in which the thickness of the third electroactive film 113 is equal to the thicknesses of the first electroactive film 111 and the second electroactive film 112. The thicknesses of electroactive films having different moduli are adjusted to affect the width or the number of resonance frequencies.

The first electroactive film 111 has the same modulus as the second electroactive film 112 and the third electroactive film 113 has a modulus different from that of the first electroactive film 111 and the second electroactive film 112. That is, a first modulus of the first electroactive film 111 is equal to a second modulus of the second electroactive film 112 and a third modulus of the third electroactive film 113 is different from the first modulus and the second modulus. Therefore, in the touch sensitive element 100 illustrated in FIG. 1, the third electroactive film 113 having a modulus different from the first modulus of the first electroactive film 111 and the second modulus of the second electroactive film 112 is disposed between the first electroactive film 111 and the second electroactive film 112. Therefore, the electroactive layer 110 has a structure in which the electroactive films are non-sequentially laminated according to the magnitudes of the moduli.

As described above, when the electroactive layer 110 has a structure in which the plurality of electroactive films 111, 112, and 113 is laminated and the laminated electroactive films 111, 112, and 113 are not sequentially disposed from the upper direction or a lower direction according to magnitudes of the moduli but are non-sequentially disposed, excellent vibration acceleration may be implemented in a broad frequency range. That is, the electroactive films 111, 112, and 113 having different moduli are non-sequentially disposed in one direction so that a touch sensitive element 100 having an excellent frequency response characteristic may be implemented. The excellent frequency response characteristic means that the touch sensitive element 100 implements the excellent vibration not only in a specific frequency domain, implements sufficient vibration but also in various frequency domains.

Generally, an electroactive layer configured by one electroactive polymer has a property which exhibits a strong vibration characteristic at a specific frequency. That is, the electroactive layer configured by one electroactive polymer has one resonance frequency. Therefore, the touch sensitive element including the electroactive layer configured by one electroactive polymer implements strong vibration strength only in a resonance frequency domain so that the touch sensitive element may implement an insufficient vibration strength at other frequencies. Therefore, it is difficult to implement sufficient vibration at various frequencies and it is insufficient to transmit a tactile feedback of various textures. Therefore, a study on a touch sensitive element which may implement strong vibration acceleration at various frequencies is being performed. To this end, a structure in which the plurality of electroactive layers is laminated to change the vibration strength and the vibration frequency of the touch sensitive element has been considered. However, when the plurality of electroactive layers is simply laminated without considering the modulus, the vibration strength is significantly increased at a specific frequency or the resonance frequency is changed, but it is insufficient to implement excellent vibration strength in a broad frequency domain. Differently from this, as in the touch sensitive element 100 according to the exemplary embodiment of the present disclosure, when at least some of the plurality of electroactive films have different modulus and the plurality of electroactive films is non-sequentially laminated according to the magnitudes of the moduli, the number of resonance frequencies of the electroactive layer 110 is increased or a width of the resonance frequency is broadened. Therefore, it is possible to implement sufficient vibration strength in various frequency domains.

In the meantime, in the touch sensitive element 100 illustrated in FIG. 1, the plurality of electroactive films has at least two different resonance frequencies. As described above, the electroactive layer configured by one electroactive polymer has one resonance frequency. When the electroactive layer is configured by different materials or has different moduli, the resonance frequency may vary. Therefore, in the touch sensitive element 100 illustrated in FIG. 1, the first electroactive film 111 may have the same resonance frequency as the second electroactive film 112. The third electroactive film 113 may have a resonance frequency different from that of the first electroactive film 111 and the second electroactive film 112.

An effect of the touch sensitive element 100 according to the exemplary embodiment of the present disclosure as described above will be described with reference to FIGS. 2A, 2B, and 3A to 3C.

Figure 2A:
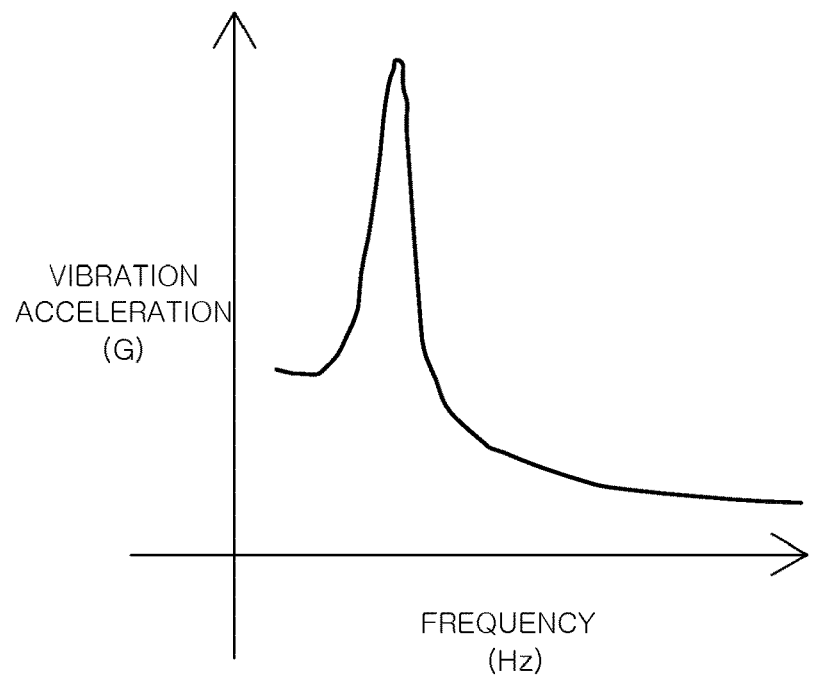
FIGS. 2A and 2B are schematic graphs for explaining response characteristics according to a frequency of two electroactive films having different moduli.
Figure 2B:
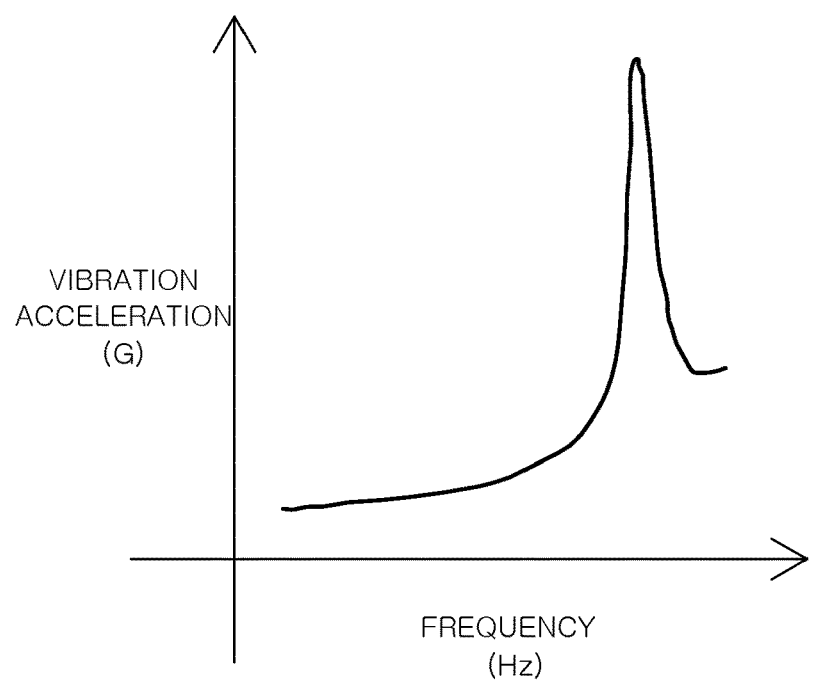

FIGS. 2A and 2B are schematic graphs for explaining response characteristics according to a frequency of two electroactive films having different moduli. Specifically, FIG. 2A illustrates a level of a vibration acceleration according to a frequency of the touch sensitive element in which the electroactive layer is configured by one electroactive film having a small modulus. FIG. 2B illustrates a level of a vibration acceleration according to a frequency of the touch sensitive element in which the electroactive layer is configured by one electroactive film having a large modulus. For example, the electroactive layer of FIG. 2A may be a PVDF terpolymer and the electroactive layer of FIG. 2B may be a PVDF homopolymer.

Referring to FIG. 2A, since the touch sensitive element configured by one electroactive film having a small modulus has a resonance frequency in which high vibration acceleration is represented at a low frequency, it exhibits excellent response characteristic only at a low frequency. In contrast, referring to FIG. 2B, since the touch sensitive element configured by one electroactive film having a large modulus has a resonance frequency in which high vibration acceleration is represented at a high frequency, it exhibits excellent response characteristic only at a high frequency.

Figure 3A:
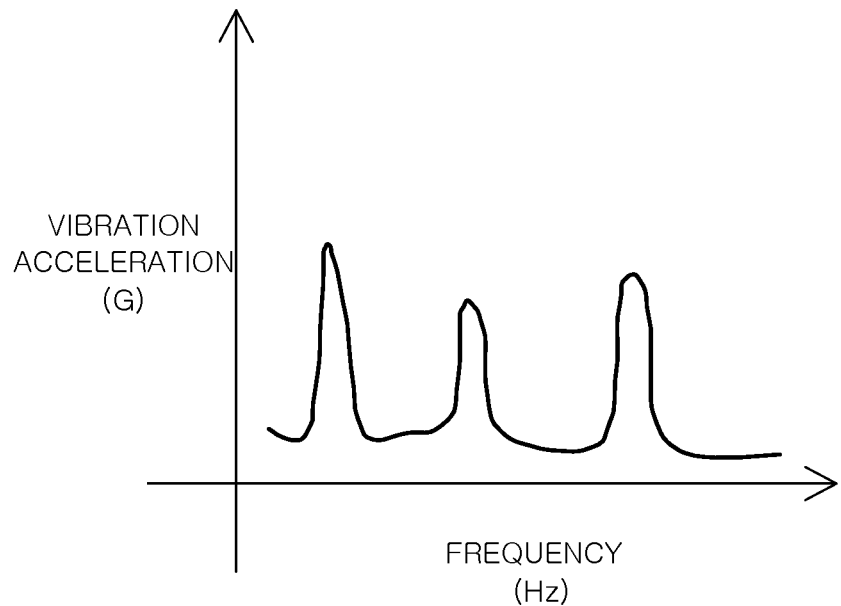
FIGS. 3A to 3C are schematic graphs for explaining response characteristics according to a frequency of touch sensitive elements according to Implemented Examples 1 to 3.
Figure 3B:
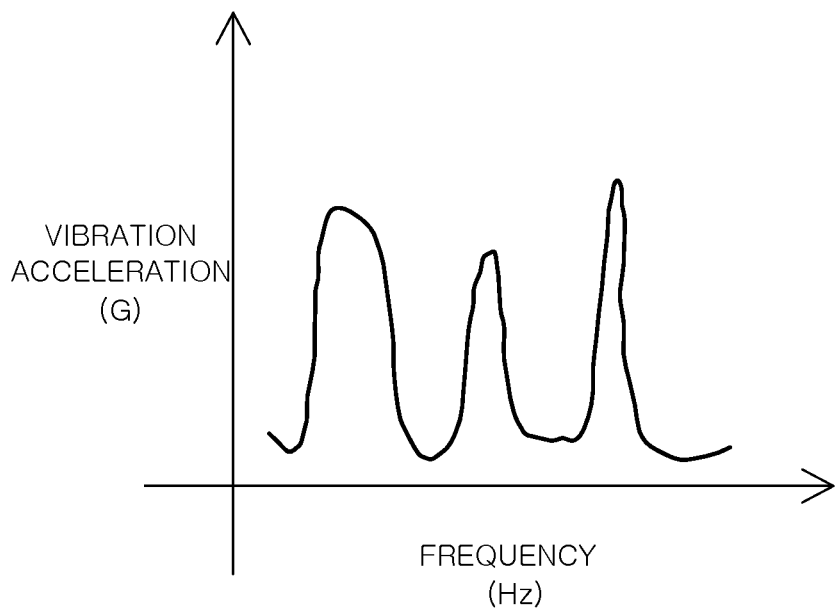
Figure 3C:
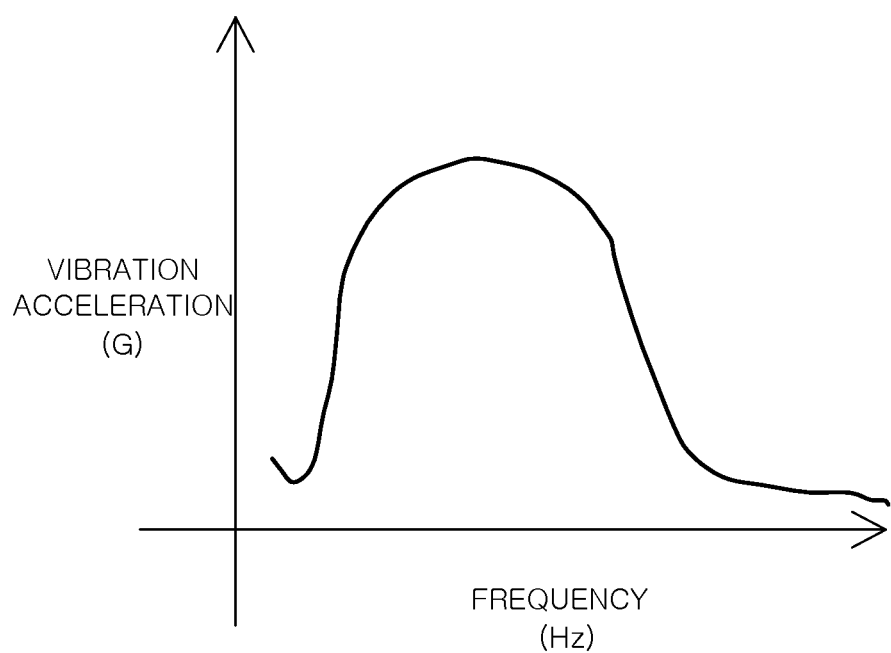

FIGS. 3A to 3C are schematic graphs for explaining response characteristics according to a frequency of touch sensitive elements according to Implemented Examples 1 to 3.

Implemented Example 1

Implemented Example 1 is a touch sensitive element 100 in which a first modulus of the first electroactive film 111 and a second modulus of the second electroactive film 112 are larger than a third modulus of the third electroactive film 113. Specifically, the first electroactive film 111 and the second electroactive film 112 may be configured by a PVDF homopolymer and the third electroactive film 113 may be configured by a PVDF terpolymer. Here, the first electroactive film 111, the second electroactive film 112, and the third electroactive film 113 have the same thickness.

FIG. 3A is a schematic graph for explaining response characteristics according to a frequency of a touch sensitive element according to Implemented Example 1. As disposed in Implemented Example 1, when the electroactive film having a small modulus is disposed in the middle and electroactive films having large modulus are disposed up and down, a plurality of resonance frequencies is generated. Therefore, as compared with FIGS. 2A and 2B, Implemented Example 1 exhibits a response characteristic at a low frequency and a high frequency and also exhibits the response characteristic even at a medium frequency.

Implemented Example 2

Implemented Example 2 is a touch sensitive element in which a first modulus of the first electroactive film 111 and a second modulus of the second electroactive film 112 are smaller than a third modulus of the third electroactive film 113. Specifically, the first electroactive film 111 and the second electroactive film 112 may be configured by a PVDF terpolymer and the third electroactive film 113 may be configured by a PVDF homopolymer. Here, the first electroactive film 111, the second electroactive film 112, and the third electroactive film 113 have the same thickness.

FIG. 3B is a schematic graph for explaining response characteristics according to a frequency of a touch sensitive element according to Implemented Example 2. As disposed in Implemented Example 2, when the electroactive film having a large modulus is disposed in the middle and electroactive films having small modulus are disposed up and down, a plurality of resonance frequencies is generated and a width of the resonance frequency in a low frequency domain is broadened. Therefore, as compared with FIGS. 2A and 2B, the touch sensitive element according to Implemented Example 2 exhibits excellent vibration acceleration at various frequencies and broad response characteristics at a low frequency.

Implemented Example 3

Implemented Example 3 is a touch sensitive element in which a first modulus of the first electroactive film 111 and a second modulus of the second electroactive film 112 are larger than a third modulus of the third electroactive film 113. Specifically, the first electroactive film 111 and the second electroactive film 112 may be configured by a PVDF homopolymer and the third electroactive film 113 may be configured by a PVDF terpolymer. In the meantime, Implemented Example 3 is configured such that the thickness of the third electroactive film 113 is larger than the thickness of the first electroactive film 111 and the second electroactive film 112, which is different from Implemented Example 1.

FIG. 3C is a schematic graph for explaining response characteristics according to a frequency of a touch sensitive element according to Implemented Example 3. As disposed in Implemented Example 3, when the electroactive film having a small modulus is disposed in the middle and the thickness thereof is larger than that of the electroactive films having a large modulus, the frequency response characteristic is entirely broadened. Specifically, not only in the low frequency domain, but also in the high frequency domain, the width of the resonance frequency is broadened and the response characteristic for the frequency is excellent.

As described in Implemented Examples 1 to 3, in the case of the electroactive layer 110 configured by three electroactive films, the electroactive films 111, 112, and 113 having different moduli are alternately disposed. Therefore, the response characteristic for the frequency of the touch sensitive element may be improved. Two electroactive layers having different moduli are non-sequentially disposed so that new resonance frequency is formed in other frequency domains in addition to the resonance frequency of the two electroactive layers or a width of the resonance frequency is broadened. By doing this, a touch sensitive element with improved response characteristic for the frequency may be implemented.

Hereinafter, the present disclosure will be described in more detail through Examples. However, the following Examples are set forth to illustrate the present disclosure, but the scope of the present disclosure is not limited thereto.

Figure 4A:
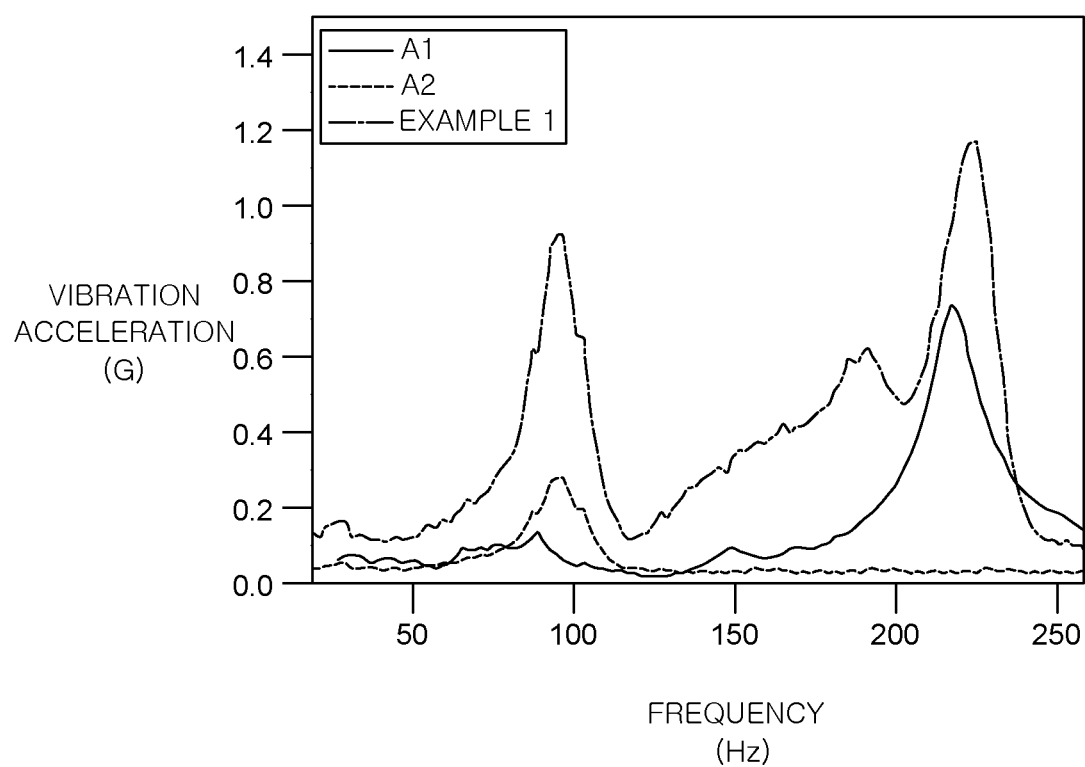
FIGS. 4A to 4C are graphs obtained by measuring a vibration acceleration according to a frequency of a touch sensitive element according to Example 1.

FIG. 4A is a graph obtained by measuring a vibration acceleration according to a frequency of a touch sensitive element according to Example 1.

A touch sensitive element according to Example 1 has an electroactive layer in which a third electroactive film which is formed of a PVDF terpolymer P(VDF-TrFE-CFE) (a modulus is 423 Mpa) and has a thickness of 15 um is disposed between a first electroactive film and a second electroactive film which are formed of a PVDF homopolymer (a modulus is 1200 Mpa) and have a thickness of 15 um.

In the meantime, the touch sensitive element according to Comparative Example A1 is formed of an electroactive layer configured by a single film which is formed of a PVDF homopolymer (a modulus is 1200 Mpa) and has a thickness of 15 um. Further, the touch sensitive element according to Comparative Example A2 is formed of an electroactive layer configured by a single film which is formed of a PVDF terpolymer P(VDF-TrFE-CFE (a modulus is 423 Mpa) and has a thickness of 15 um.

Referring to FIG. 4A, in the touch sensitive element according to Example 1, it is confirmed that a vibration acceleration in a low frequency domain (approximately, 75 to 125 Hz) is significantly increased, a width of the resonance frequency is broadened, and a vibration acceleration in a high frequency domain (approximately, 200 to 230 Hz) is increased, as compared with Comparative Example A1 configured by an electroactive layer of a single film formed of a PVDF homopolymer and Comparative Example A2 configured by an electroactive layer of a signal film formed of PVDF terpolymer. Further, differently from Comparative Examples A1 and A2, in the touch sensitive element according to Example 1, it is confirmed that a new resonance frequency is generated at 170 to 190 Hz. As described above, in the touch sensitive element according to Example 1, the vibration acceleration is improved in the low frequency and high frequency domains and a new resonance frequency is generated so that the response characteristics for both the vibration acceleration and the frequency are improved.

Figure 4B:
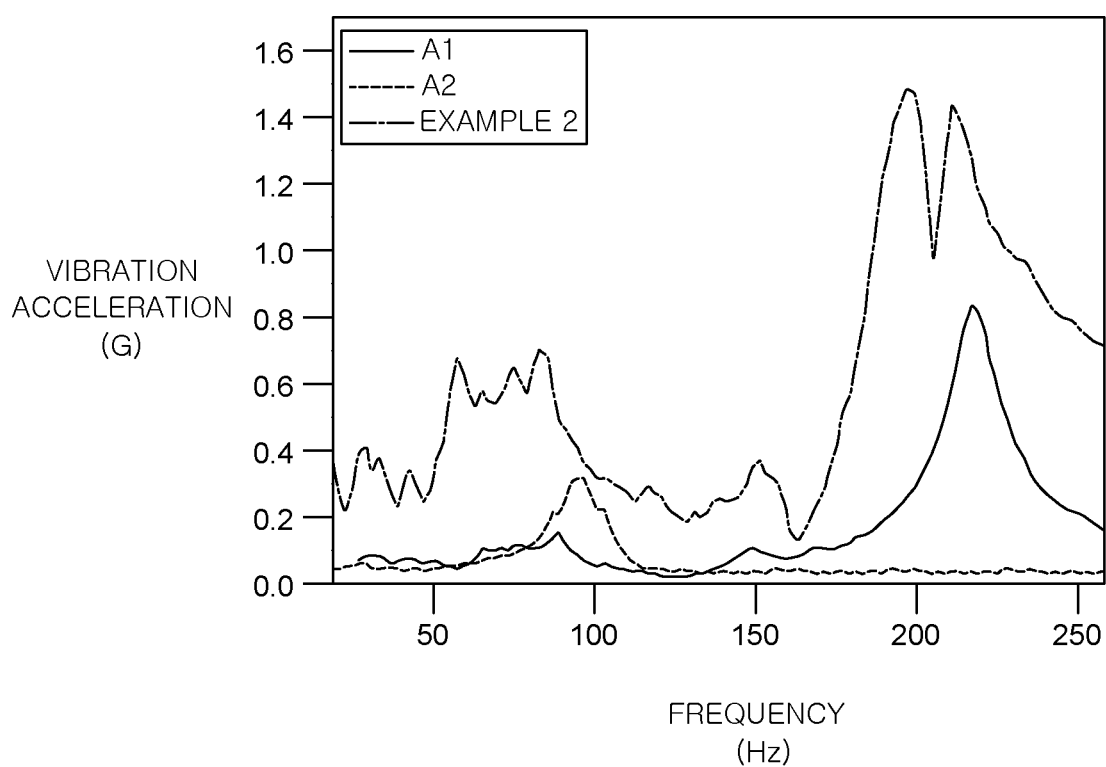

FIG. 4B is a graph obtained by measuring a vibration acceleration according to a frequency of a touch sensitive element according to Example 2.

A touch sensitive element according to Example 2 has an electroactive layer in which a third electroactive film which is formed of a PVDF homopolymer A1 (a modulus is 1200 Mpa) and has a thickness of 15 um is disposed between a first electroactive film and a second electroactive film which are formed of a PVDF terpolymer A2 P(VDF-TrFE-CFE) (a modulus is 423 Mpa) and have a thickness of 15 um.

Referring to FIG. 4B, in the touch sensitive element according to Example 2, as compared with the comparative embodiments A1 and A2, it is confirmed that the vibration acceleration in a low frequency domain (approximately 75 to 125 Hz) and the vibration acceleration in a high frequency domain (approximately 200 to 230 Hz) are increased. In addition, in the touch sensitive element according to Example 2, a plurality of resonance frequencies in the low frequency domain is generated so that it exhibits excellent response characteristic at a low frequency domain of 20 to 100 Hz.

Figure 4C:
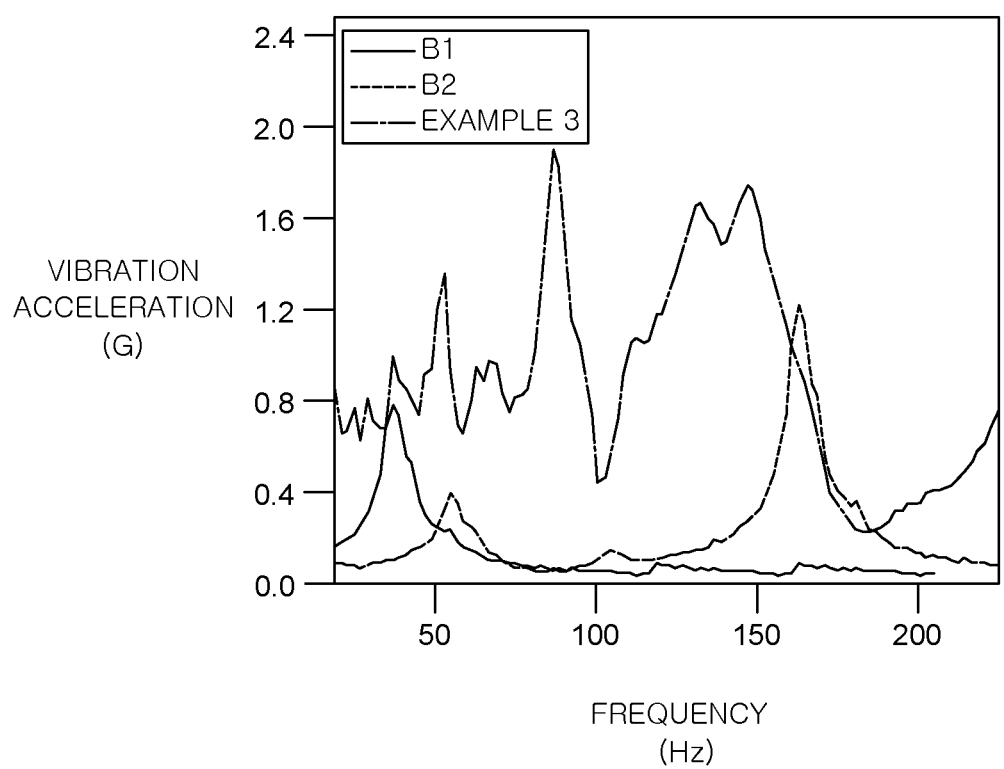

FIG. 4C is a graph obtained by measuring a vibration acceleration according to a frequency of a touch sensitive element according to Example 3.

A touch sensitive element according to Example 3 has an electroactive layer in which a third electroactive film which is formed of a PVDF terpolymer B2 P(VDF-TrFE-CFE) (a modulus is 423 Mpa) and has a thickness of 20 um is disposed between a first electroactive film and a second electroactive film which are formed of a PVDF homopolymer B1 (a modulus is 1200 Mpa) and have a thickness of 10 um.

In the meantime, the touch sensitive element according to Comparative Example B1 is formed of an electroactive layer configured by a single film which is formed of a PVDF homopolymer (a modulus is 1200 Mpa) and has a thickness of 10 um. Further, the touch sensitive element according to Comparative Example B2 is formed of an electroactive layer configured by a single film which is formed of a PVDF terpolymer P(VDF-TrFE-CFE (a modulus is 423 Mpa) and has a thickness of 20 um.

Referring to FIG. 4C, in the touch sensitive element according to Example 3, as compared with Comparative Examples B1 and B2, not only in the low frequency domain (approximately 75 to 125 Hz) and a high frequency domain (approximately, 200 to 230 Hz), but also in overall frequency domain, a plurality of resonance frequencies is generated. Further, a high vibration acceleration is generated in all frequency domains. As described above, in the touch sensitive element according to the third exemplary embodiment, the response characteristic according to the frequency is entirely broadened and thus various textures and vibration characteristics may be represented.

The touch sensitive element according to the exemplary embodiment of the present disclosure includes an electroactive layer having a structure in which at least some of electroactive films have different modulus and a plurality of electroactive films is non-sequentially laminated according to the magnitude of the modulus. Therefore, the number of resonance frequencies of the electroactive layer is increased or a width of the resonance frequency is increased, so that sufficient vibration strength may be implemented in various frequency domains. Therefore, it is possible to provide various and precise tactile senses to the user.

Figure 5:
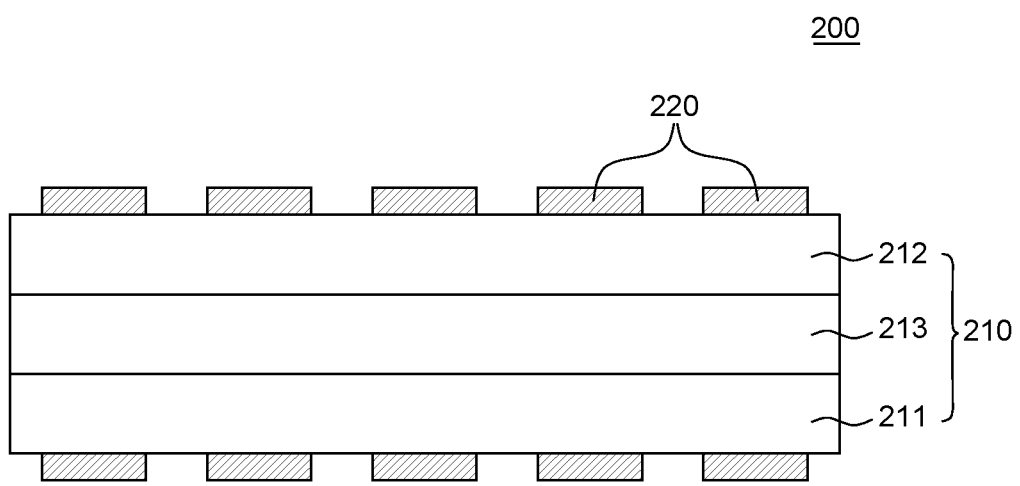
FIG. 5 is a schematic cross-sectional view for explaining a touch sensitive element according to another exemplary embodiment of the present disclosure.

FIG. 5 is a schematic cross-sectional view for explaining a touch sensitive element according to another exemplary embodiment of the present disclosure. Referring to FIG. 5, a touch sensitive element 100 according to an exemplary embodiment of the present disclosure includes an electroactive layer 210 and an electrode 220. The touch sensitive element 200 illustrated in FIG. 5 is the same as the touch sensitive element 100 illustrated in FIG. 1 except that the electroactive layer 210 includes three electroactive films having different moduli. Therefore, a redundant description will be omitted.

Specifically, the electroactive layer 210 includes a first electroactive film 211 having a first modulus, a second electroactive film 212 having a second modulus, and a third electroactive film 213 having a third modulus. The first modulus, the second modulus, and the third modulus are different from each other. The modulus of the third electroactive film 213 disposed between the first electroactive film 211 and the second electroactive film 212 is larger or smaller than both the moduli of the first electroactive film 211 which is in contact with a lower surface and the second electroactive film 212 which is in contact with an upper surface. That is, the third modulus is larger or smaller than both the first modulus and the second modulus. By doing this, the first electroactive film 211, the second electroactive film 212, and the third electroactive film 213 which configure the electroactive layer are non-sequentially laminated according to the magnitudes of the moduli.

The touch sensitive element having a structure in which three electroactive layers having different moduli are non-sequentially disposed according to the magnitudes of the moduli has significantly excellent response characteristic according to the frequency, as compared with a touch sensitive element having a structure in which three electroactive layers having different moduli are sequentially disposed according to the magnitudes of the moduli.

Hereinafter, an improved response effect according to a frequency of a touch sensitive element according to another exemplary embodiment of the present disclosure will be described in detail through Examples. However, the following Examples are set forth to illustrate the present disclosure, but the scope of the present disclosure is not limited thereto.

Figure 6:
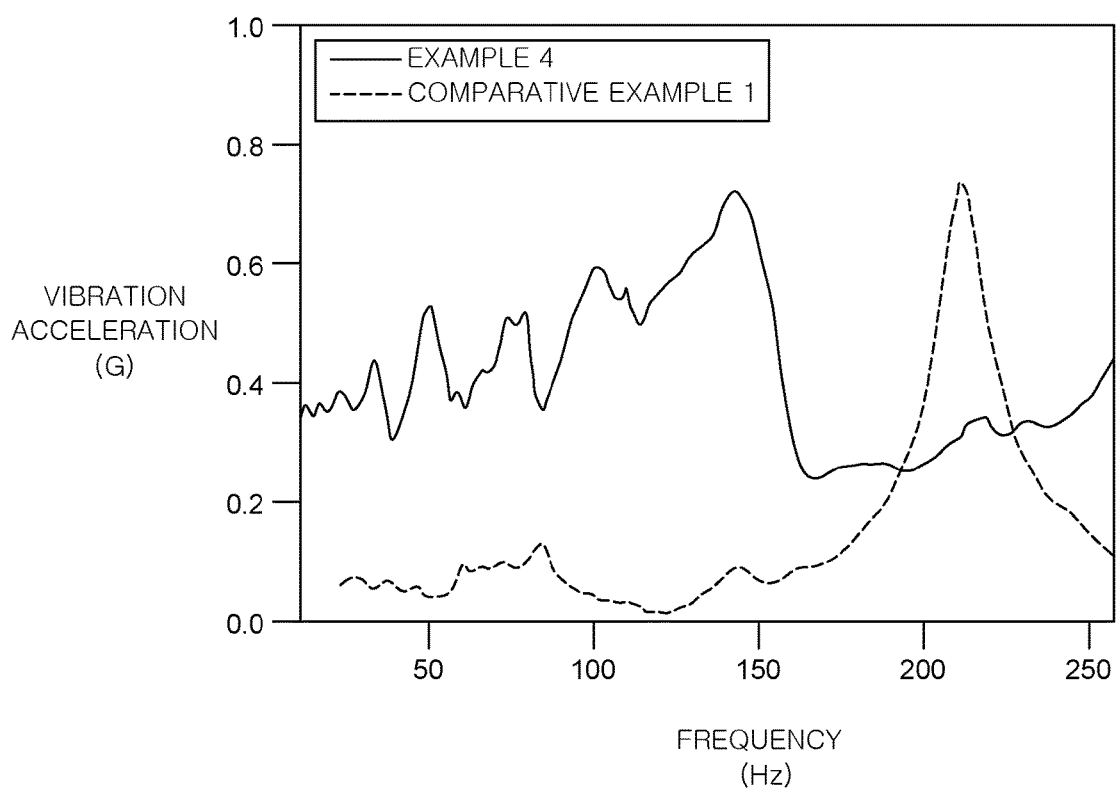
FIG. 6 is a graph obtained by measuring a vibration acceleration according to a frequency of Example 4 and Comparative Example 1.

FIG. 6 is a graph obtained by measuring vibration acceleration according to a frequency of Example 4 and Comparative Example 1.

Touch sensitive elements according to Example 4 and Comparative Example 1 include a first electroactive film, a second electroactive film, and a third electroactive film which are formed of PVDF terpolymer P(VDF-TrFE-CFE). In this case, the modulus of each of the electroactive films is adjusted by varying a fraction of a repeating unit of the PVDF terpolymer P(VDF-TrFE-CFE) which configures the electroactive film. The fraction and the modulus of the PVDF terpolymer P(VDF-TrFE-CFE) which configures the electroactive films of Example 4 and Comparative Example 1 are represented in the following Table 1.

TABLE 1

| Classification | Compound C1 | Compound C2 | Compound C3 |
|---|---|---|---|
| Fraction of monomer VDF:TrFE:CFE | 64:28:8 | 62:30:8 | 62:26:12 |
| Modulus (Mpa) | 115 | 423 | 646 |

The touch sensitive element according to Example 4 has an electroactive layer in which a third electroactive film which is formed of a compound C3 (a modulus is 646 Mpa) and has a thickness of 10 um is disposed between a first electroactive film which is formed of a compound C2 (a modulus is 423 Mpa) and has a thickness of 10 um and a second electroactive film which is formed of a compound C1 (a modulus is 115 Mpa) and has a thickness of 10 um. That is, the touch sensitive element according to Example 4 has a structure in which a modulus of the third electroactive film disposed in the middle is higher than those of the first electroactive film and the second electroactive film disposed thereon and therebelow.

Differently from this, a touch sensitive element according to Comparative Example 1 has an electroactive layer in which a third electroactive film which is formed of a compound C2 (a modulus is 423 Mpa) and has a thickness of 10 um is disposed between a first electroactive film which is formed of a compound C1 (a modulus is 115 Mpa) and has a thickness of 10 um and a second electroactive film which is formed of a compound C3 (a modulus is 646 Mpa) and has a thickness of 10 um. That is, the touch sensitive element according to Comparative Example 1 has a structure of sequentially laminating from an electroactive film having a small modulus to an electroactive film having a large modulus.

Referring to FIG. 6, the touch sensitive element according to Comparative Example 1 has high vibration acceleration only in a high frequency domain (200 to 230 Hz) and has very low vibration acceleration in a low frequency domain. Therefore, a response characteristic according to the frequency of the touch sensitive element according to Comparative Example 1 is not good. However, the touch sensitive element according to Example 4 has a high vibration acceleration in all frequency domains except a part of high frequency domain (200 to 230 Hz) and has a plurality of resonance frequencies in a low frequency domain.

As seen from FIG. 6, the touch sensitive element having a structure in which three electroactive films having different moduli are non-sequentially laminated according to the magnitudes of the moduli exhibits high vibration acceleration in all frequency domains and specifically, exhibits high vibration acceleration in a low frequency domain. Therefore, it is possible to implement various textures and vibration characteristics.

Figure 7:
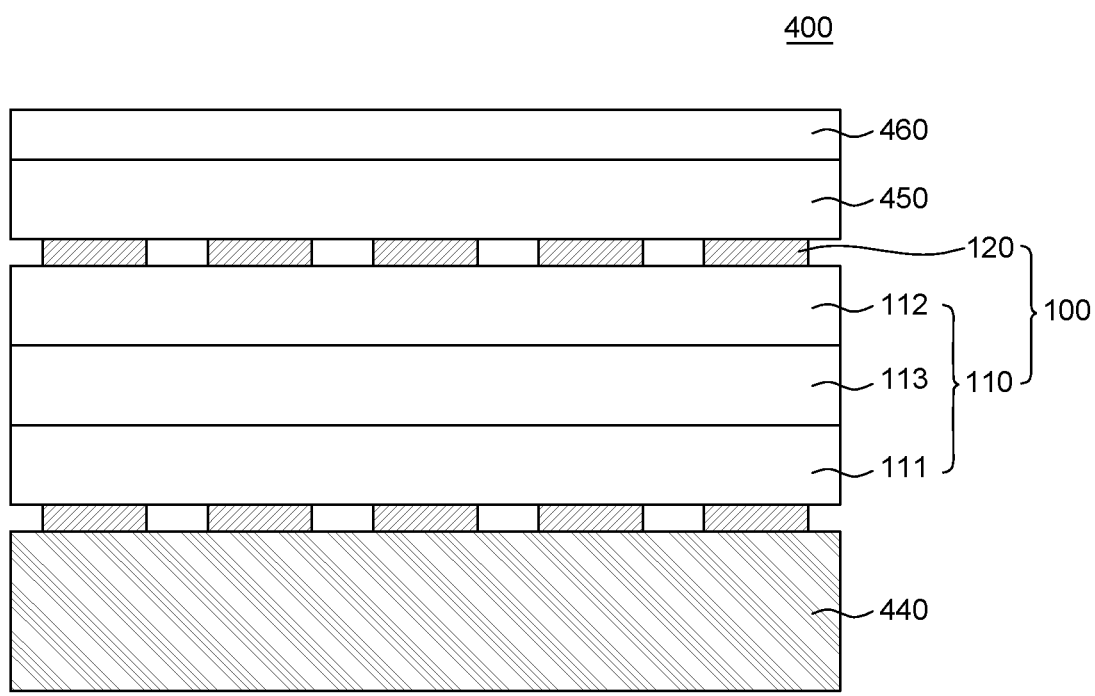
FIG. 7 is a schematic cross-sectional view for explaining a display device according to an exemplary embodiment of the present disclosure.

FIG. 7 is a schematic cross-sectional view for explaining a display device including a touch sensitive element according to an exemplary embodiment of the present disclosure. Referring to FIG. 7, a display device 400 includes a display panel 440, a touch sensitive element 100, a touch panel 450, and a cover 460. In this case, the touch sensitive element 100 included in the display device 400 of FIG. 7 is the same as the touch sensitive element 100 according to the exemplary embodiment of the present disclosure which has been described with reference to FIG. 1. Therefore, a redundant description of the touch sensitive element 100 will be omitted.

The display panel 440 refers to a panel in which a display element for displaying an image in the display device 400 is disposed. As the display panel 440, for example, various display panels such as an organic light emitting display panel, a liquid crystal display panel, and an electro phoretic display panel may be used.

The touch panel 450 is disposed on the touch sensitive element 100. The touch panel 450 refers to a panel which senses a user's touch input to the display device 400. As the touch panel 450, for example, a capacitive type, a resistive type, an ultrasonic type, an infrared type, or the like, may be used, but a capacitive type touch panel may be used as the touch panel 450. The display device 400 illustrated in FIG. 7 includes an add-on type touch panel 450 in which a separately manufactured touch panel 450 is separately disposed on the display panel 440.

A cover 460 is disposed on the touch panel 450. The cover 460 is a configuration for protecting the display device from an impact from the outside of the display device 400. The cover 460 may be formed of a transparent insulating material.

Even though not illustrated in FIG. 7, an adhesive layer may be used to bond the display panel 440, the touch sensitive element 100, the touch panel 450, and the cover 460 to each other. As the adhesive layer, for example, an optical clear adhesive (OCA) or an optical clear resin (OCR) may be used, but the adhesive layer is not limited thereto.

The display device according to the exemplary embodiment of the present disclosure includes a touch sensitive element which is transparent and implements sufficient vibration strength in all frequency domains so that the touch sensitive element is disposed above the display panel and provides tactile feedback of various textures to the user.

Figure 8:
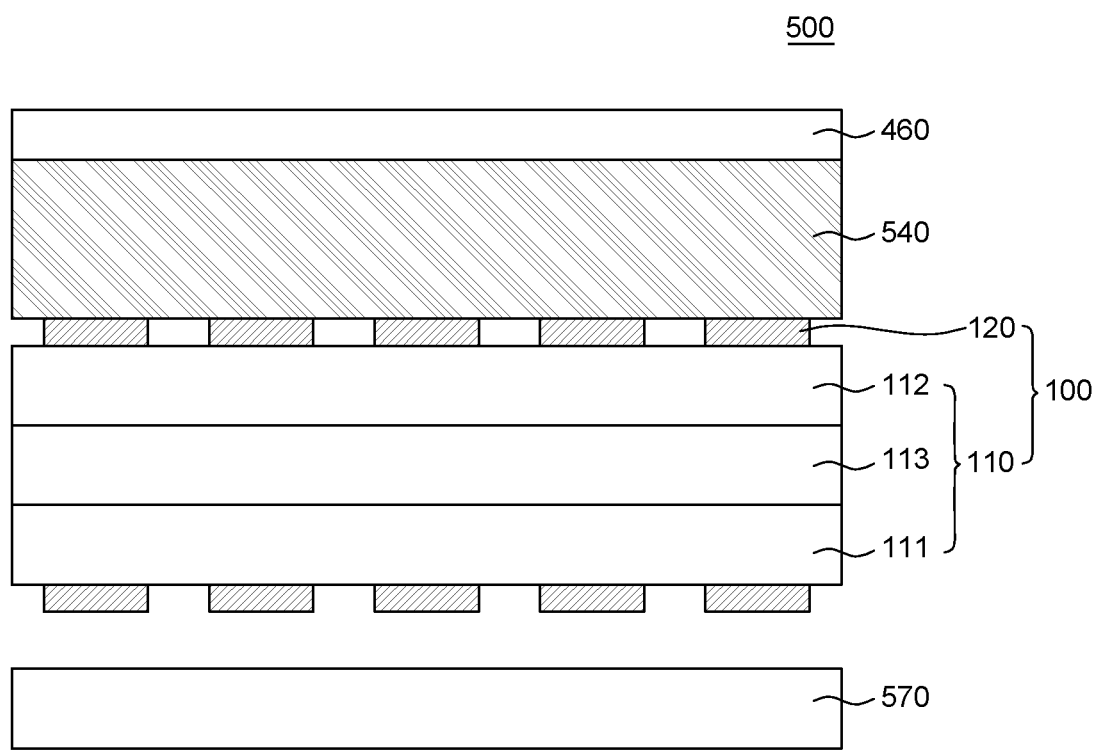
FIG. 8 is a schematic cross-sectional view for explaining a display device according to another exemplary embodiment of the present disclosure.

FIG. 8 is a schematic cross-sectional view for explaining a display device including a touch sensitive element according to another exemplary embodiment of the present disclosure. When a display device 500 illustrated in FIG. 8 is compared with the display device 400 which has been described with reference to FIG. 7, except that an in-cell type touch sensor in which instead of the separate touch panel, a touch sensor is provided to be integrated with the display panel 540 is configured, other components are substantially the same, so that the redundant description will be omitted.

The display panel 540 is a panel in which a display device for displaying an image in the display device 500 is disposed and includes a touch sensor configured to be integrated in the panel. That is, the touch sensor is disposed in the display panel 540 to configure an in-cell type touch sensor. In the in-cell type touch sensor, a common electrode of the display panel 540 is simultaneously used as a touch electrode.

In the meantime, the display panel 540 of the display device 500 illustrated in FIG. 8 may be an organic light emitting display panel or a liquid crystal display panel. With regard to this, in FIG. 8, a case in which the display panel 540 is the liquid crystal display panel will be described in detail.

The liquid crystal display panel is disposed between a cover 460 and a touch sensitive element 100. The liquid crystal display panel displays an image by adjusting transmittance of the light emitted from the backlight unit 570. The liquid crystal display panel includes a lower polarizer, a lower substrate including a thin film transistor (TFT), a liquid crystal layer, an upper substrate including a color filter, and an upper polarizer, but is not limited thereto.

When the display panel 540 of the display device 500 illustrated in FIG. 8 is a liquid crystal display panel, a backlight unit 570 which emits light toward the display panel 540 is disposed below the display panel 540.

A touch sensitive element 100 which includes a plurality of electroactive films and is configured such that a modulus of each of the electroactive films is higher or lower than moduli of two electroactive films adjacent to an upper surface and a lower surface is disposed between the display panel 540 and the backlight unit 570.

Generally, when an in-cell type touch sensor is integrated with the display panel, if the touch sensitive element is disposed on the touch sensor, the touch input may be erroneously recognized due to a noise which may be generated by a high driving voltage applied to the touch sensitive element. Therefore, the touch sensitive element may be disposed below the display panel. However, when the touch sensitive element is disposed below the display panel, since the user is located far away from the position to which the touch input is applied, the vibration strength transmitted to the user is reduced. Therefore, in order to minimize reduction of the vibration strength, the touch sensitive element may be disposed below the display panel.

However, when the display panel is a liquid crystal display panel, a light transmittance of the touch sensitive element may become an issue. As described above, there is a problem in that the shape memory alloy or the piezoelectric ceramics used in the touch sensitive element of the related art has low light transmittance. However, in the display device according to another exemplary embodiment of the present disclosure, the touch sensitive element has excellent transparency so that the touch sensitive element may be disposed between the liquid crystal display panel and the backlight unit. Further, it is possible to implement various textures.

The exemplary embodiments of the present disclosure can also be described as follows:

According to an aspect of the present disclosure, a touch sensitive element includes: an electroactive layer including a plurality of electroactive films and a plurality of electrodes disposed on at least one surface of the electroactive layer in which a modulus of each of the plurality of electroactive films is larger or smaller than moduli of two electroactive films adjacent to an upper surface and a lower surface.

The plurality of electroactive films may have a structure in which two electroactive films having different moduli are alternately laminated.

The plurality of electroactive films may have a structure in which three or more electroactive films having different moduli are non-sequentially laminated.

The plurality of electroactive films may be formed of an electroactive polymer (EAP).

The electroactive polymer may be at least one of a PVDF homopolymer, a PVDF copolymer, and a PVDF terpolymer.

The electroactive polymer may be a PVDF terpolymer, and the PVDF terpolymer which configures each of the plurality of electroactive films may have a different fraction of a repeating unit.

A resonance frequency of each of the plurality of electroactive films may be different from a resonance frequency of an electroactive film which is in contact with an upper surface and a resonance frequency of an electroactive film which is in contact with a lower surface.

According to another aspect of the present disclosure, a touch sensitive element includes: an electroactive layer which is formed of a first electroactive film having a first modulus, a second electroactive film having a second modulus, and a third electroactive film having a third modulus disposed between the first electroactive film and the second electroactive film; and a plurality of electrodes disposed on at least one surface of the electroactive layer in which the third modulus is larger or smaller than the first modulus and the second modulus.

The first modulus may be equal to the second modulus and the third modulus may be larger than the first modulus and the second modulus.

The first modulus may be equal to the second modulus and the third modulus may be smaller than the first modulus and the second modulus.

A thickness of the first electroactive film may be equal to a thickness of the second electroactive film and a thickness of the third electroactive film may be different from the thickness of the first electroactive film and the thickness of the second electroactive film.

The first modulus, the second modulus, and the third modulus may be different from each other.

The first electroactive film, the second electroactive film, and the third electroactive film may be formed of a PVDF-based polymer.

According to an yet another aspect of the present disclosure, a touch sensitive element includes: an electroactive layer which is formed of a first electroactive film, a second electroactive film, and a third electroactive film disposed between the first electroactive film and the second electroactive film; and a plurality of electrodes disposed on at least one surface of the electroactive layer in which a resonance frequency of the third electroactive film is different from resonance frequencies of the first electroactive film and the second electroactive film.

The resonance frequency of the first electroactive film may be different from a resonance frequency of the second electroactive film.

A modulus of the third electroactive film may be larger or smaller than both a modulus of the first electroactive film and a modulus of the second electroactive film.

According to an another aspect of the present disclosure, a display device includes a display panel, a cover disposed above the display panel; and a touch sensitive element disposed below the cover in which the touch sensitive element includes an electroactive layer including a plurality of electroactive films and a plurality of electrodes disposed on at least one surface of the electroactive layer and a modulus of each of the plurality of electroactive films is larger or smaller than moduli of two electroactive films adjacent to an upper surface and a lower surface.

The plurality of electroactive films may have a structure in which two electroactive films having different moduli are alternately laminated.

The plurality of electroactive films may have a structure in which three or more electroactive films having different moduli are non-sequentially laminated.

The plurality of electroactive films may be formed of an electroactive polymer.

The display device may further include an add-on type touch panel which is separately disposed on the display panel and the touch sensitive element is disposed between the display panel and the touch panel.

The display panel may include a touch sensor configured to be integrated in the panel and the touch sensitive element is disposed below the display panel.

The display panel may be a liquid crystal display panel, a backlight unit disposed below the display panel may be further included, and the touch sensitive element may be disposed between the liquid crystal display panel and the backlight unit.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical spirit of the present disclosure. The scope of the technical spirit of the present disclosure is not limited thereto. The protective scope of the present disclosure should be construed based on the following claims, and all the technical concepts in the equivalent scope thereof should be construed as falling within the scope of the present disclosure.

What is claimed is:

1. A touch sensitive element, comprising:
   an electroactive layer including a plurality of electroactive films, the plurality of electroactive films comprising a first electroactive film, a second electroactive film, and one or more intermediate electroactive films between the first electroactive film and the second electroactive film, wherein each of the one or more intermediate electroactive films is in contact with two of the plurality of electroactive films; and
   a plurality of electrodes apart from each other and disposed on at least one surface of the electroactive layer,
   wherein a modulus of each of the one or more intermediate electroactive films is larger or smaller than moduli of the first electroactive film and the second electroactive film.

2. The touch sensitive element according to claim 1, wherein the plurality of electroactive films has a structure in which two electroactive films having different moduli are alternately laminated.

3. The touch sensitive element according to claim 1, wherein the plurality of electroactive films has a structure in which three or more electroactive films having different moduli are non-sequentially laminated.

4. The touch sensitive element according to claim 1, wherein the plurality of electroactive films is formed of an electroactive polymer (EAP).

5. The touch sensitive element according to claim 4, wherein the electroactive polymer is at least one of a PVDF homopolymer, a PVDF copolymer, and a PVDF terpolymer.

6. The touch sensitive element according to claim 4, wherein the electroactive polymer is a PVDF terpolymer, and the PVDF terpolymer which configures each of the plurality of electroactive films has a different fraction of a repeating unit.

7. The touch sensitive element according to claim 1, wherein a resonance frequency of each electroactive film of the plurality of electroactive films is different from a resonance frequency of one or more of the plurality of electroactive films that is in contact with the electroactive film.

8. A touch sensitive element, comprising:
   an electroactive layer which is formed of a first electroactive film having a first modulus, second electroactive film having a second modulus, and a third electroactive film having a third modulus disposed between the first electroactive film and the second electroactive film, wherein the first modulus is equal to the second modulus, and the third modulus is larger than the first modulus and the second modulus; and
   a plurality of electrodes disposed on at least one surface of the electroactive layer.

9. The touch sensitive element of claim 8, wherein a thickness of the first electroactive film is equal to a thickness of the second electroactive film and a thickness of the third electroactive film is different from the thickness of the first electroactive film and the thickness of the second electroactive film.

10. The touch sensitive element according to claim 8, wherein the first electroactive film, the second electroactive film, and the third electroactive film are formed of a PVDF-based polymer.

11. A touch sensitive element, comprising:
    an electroactive layer which is formed of a first electroactive film, a second electroactive film, and a third electroactive film disposed between the first electroactive film and the second electroactive film and is in contact with the first electroactive film and the second electroactive film; and
    a plurality of electrodes disposed on at least one surface of the electroactive layer,
    wherein a resonance frequency of the third electroactive film is different from resonance frequencies of the first electroactive film and the second electroactive film.

12. The touch sensitive element according to claim 11, wherein the resonance frequency of the first electroactive film is different from a resonance frequency of the second electroactive film.

13. The touch sensitive element according to claim 11, wherein a modulus of the third electroactive film is larger or smaller than both a modulus of the first electroactive film and a modulus of the second electroactive film.

14. A display device, comprising:
    a display panel;
    a cover disposed above the display panel; and
    a touch sensitive element disposed below the cover,
    wherein the touch sensitive element includes:
       an electroactive layer including a plurality of electroactive films, the plurality of electroactive films comprising a first electroactive film, a second electroactive film, and one or more intermediate electroactive films between the first electroactive film and the second electroactive film, wherein each of the one or more intermediate electroactive films is in contact with two of the plurality of electroactive films; and
       a plurality of electrodes apart from each other and disposed on at least one surface of the electroactive layer, and
       wherein a modulus of each of the one or more intermediate electroactive films is larger or smaller than moduli of the first electroactive film and the second electroactive film.

15. The display device according to claim 14, wherein the plurality of electroactive films has a structure in which two electroactive films having different moduli are alternately laminated.

16. The display device according to claim 14, wherein the plurality of electroactive films has a structure in which three or more electroactive films having different moduli are non-sequentially laminated.

17. The display device according to claim 14, wherein the plurality of electroactive films is formed of an electroactive polymer.

18. The display device according to claim 14, further comprising:
- an add-on type touch panel which is separately disposed on the display panel,
- wherein the touch sensitive element is disposed between the display panel and the touch panel.

19. The display device according to claim 14, wherein the display panel includes a touch sensor configured to be integrated in the panel and the touch sensitive element is disposed below the display panel.

20. The display device according to claim 19, wherein the display panel is a liquid crystal display panel,
- a backlight unit disposed below the display panel is further included, and
- the touch sensitive element is disposed between the liquid crystal display panel and the backlight unit.

21. A touch sensitive element, comprising:
- an electroactive layer which is formed of a first electroactive film having a first modulus, second electroactive film having a second modulus, and a third electroactive film having a third modulus disposed between the first electroactive film and the second electroactive film, wherein the first modulus is equal to the second modulus, and the third modulus is smaller than the first modulus and the second modulus; and
- a plurality of electrodes disposed on at least one surface of the electroactive layer.

* * * * *